Patented Nov. 17, 1942

2,301,968

UNITED STATES PATENT OFFICE 2,301,968

RUBBER COMPOSITION

Warren E. Phillips, Cuyahoga Falls, Ohio, assignor to The B. F. Goodrich Company, New York, N. Y., a corporation of New York No Drawing. Application April 19, 1939, Serial No. 268,821

7 Claims. (Cl. 260—765)

This invention relates to rubber compositions having improved physical properties and to a method of preparing the same.

It is known that the incorporation of magnesium oxide in rubber compositions produces a remarkable increase in tear resistance, particularly at high temperatures. Unfortunately, however, the use of magnesium oxide imparts to rubber compositions vulcanized with the assistance of ordinary commercial accelerators such as the aldehyde-amines, the dithiocarbamates, and the mercapto arylene thiazoles certain undesirable properties. Thus rubber stocks containing ordinary rubber-sulfur ratios exhibit greatly increased hysteresis and permanent set when cured in the presence of magnesium oxide. It has not been possible, therefore, to take advantage of the improved tear-resistance imparted to rubber by magnesium oxide.

It is the principal object of this invention to provide a method whereby rubber compositions may be vulcanized in the presence of magnesium oxide without developing the undesirable characteristics ordinarily accompanying the use of magnesia.

The object of this invention is attained by vulcanizing with the assistance of a mercapto aliphatic thiazole accelerator a rubber composition containing magnesium oxide. The mercapto aliphatic thiazole accelerators are a class of compounds containing the structure

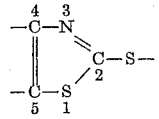

wherein the adjoining carbon atoms do not constitute part of another ring structure. Typical aliphatic thiazole accelerators include 2-mercapto-4,5-dimethylthiazole, 2-mercapto-4-ethylthiazole, 2-mercapto-4-methyl-5-ethylthiazole, the sodium and zinc salts of 2-mercapto-4,5-dimethylthiazole, and di-4,5-dimethylthiazyl disulfide. Accelerators such as 2-mercapto-4-phenylthiazole which contain an aryl group on one or both adjoining carbon atoms are considered to be mercapto aliphatic thiazoles since they possess the unique properties of this class of compounds, and carbon atoms 4 and 5 are not included in another ring structure.

The two preferred classes of mercapto aliphatic thiazole accelerators are the 2-mercaptoalkyl thiazoles having the general formula

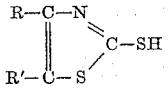

wherein R represents a member of the class consisting of hydrogen and alkyl groups and R' represents an alkyl group, and the di-alkylthiazyl mono- and polysulfides containing the structure

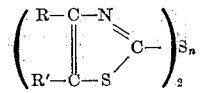

wherein R and R' are as above and $n$ represents an integer from 1 to 4 inclusive.

The magnesium oxide may be a light or heavy grade of the commercially available material, and ordinarily produces the maximum improvement in properties when incorporated in the rubber composition in small amounts of from .1% to 3.0% of the weight of rubber, although the use of a mercapto aliphatic thiazole accelerator permits the use of magnesia in higher quantities if desired.

To demonstrate the improvements obtainable by the method of this invention, varying amounts of light calcined magnesia were included in two typical tire carcass stocks which differed only in that composition A contained as the accelerator 0.4 part, based on the rubber, of 2-mercaptobenzothiazole and composition B contained 0.4 part of a mixture consisting of about 80 parts of 2-mercapto-4,5-dimethylthiazole and 20 parts of 2-mercapto 4-ethylthiazole. The stocks were then vulcanized and tested for hysteresis and permanent set by the method described by Lessig, Ind. and Eng. Chem. Analyt. ed. 1937, p. 582, and for tear resistance. The results are tabulated below:

| Composition | Parts of magnesium oxide | Temperature rise (°F.) during flexure room temp. | Permanent set (%) 212° F. | Tear resistance 212° F. |
|---|---|---|---|---|
| A | 0 | 40 | 4.4 | Poor. |
| B | 0 | 24 | 2.9 | Do. |
| A | .1 | 31 | 3.6 | Do. |
| B | .1 | 32 | 3.6 | Good. |
| A | .2 | 39 | 6.3 | Do. |
| B | .2 | 25 | 3.2 | Excellent. |
| A | .5 | 40 | 5.4 | Do. |
| B | .5 | 28 | 4.1 | Do. |
| A | 2.0 | 60 | 16.6 | Do. |
| B | 2.0 | 25 | 3.2 | Do. |
| A | 5.0 | 69 | 25.8 | Do. |
| B | 5.0 | 31 | 4.5 | Do. |
| A | 10.0 | 91 | 43.3 | Do. |
| B | 10.0 | 35 | 4.8 | Do. |

Similar results have been obtained by substituting mercapto aliphatic thiazoles for other accelerators in tread and inner tube stocks containing from about 2 parts or more of sulfur per 100 parts of rubber. In certain low-sulfur tire tread stocks containing .75 part of sulfur, it was observed that the improvement obtained by substituting a mercapto aliphatic thiazole for another accelerator manifested itself as a large increase in resistance to flex-cracking. In all ordinary rubber compositions, however, the low hysteresis and permanent set of the vulcanizates are the most noticeable improvements obtained by the use of the mercapto aliphatic thiazoles in a magnesia-containing rubber composition. Regardless of the rubber-sulfur ratio, it has been found that the method of this invention produces substantial improvements in one or more properties of the vulcanized compositions, and permits the use of magnesium oxide to a much greater extent than it has been possible to use this material before.

Although the use of the magnesium oxide and alkyl thiazoles has been described in detail in connection with specific rubber compositions, it will be evident that this invention is applicable to rubber compositions of the most varied nature, and that all manner of rubber goods including pneumatic and solid rubber tires, tubes, hose, belting, packing, boots and shoes, surgical rubber goods, seamless dipped rubber articles, etc. may be vulcanized in the manner herein described.

It is to be understood that the term "a rubber" is employed in the appended claims in a generic sense to designate rubbery materials capable of vulcanization when heated with sulfur and includes caoutchouc, balata, gutta percha, latex, rubber isomers, and synthetic rubber.

While I have herein described specific embodiments of my invention, I do not intend to limit the invention solely thereto, for it will be obvious to those skilled in the art that many modifications are within the spirit and scope of the invention as defined in the appended claims.

I claim:

1. The process which comprises vulcanizing a rubber in the presence of an amount not exceeding about 10% by weight based on the rubber of magnesium oxide and a 2-mercaptoalkylthiazole.

2. The process which comprises vulcanizing a rubber in the presence of an amount not exceeding about 10% by weight based on the rubber of magnesium oxide and a di-alkylthiazyl sulfide.

3. The process which comprises vulcanizing a rubber in the presence of an amount not exceeding about 10% by weight based on the rubber of magnesium oxide and 2-mercapto-4,5-dimethylthiazole.

4. A rubber composition comprising a rubber which has been vulcanized in the presence of an amount not exceeding about 10% by weight based on the rubber of magnesium oxide and an accelerator containing the structure

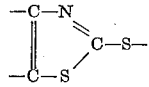

wherein the adjoining carbon atoms do not constitute part of another ring structure.

5. A rubber composition comprising a rubber which has been vulcanized in the presence of an amount not exceeding about 10% by weight based on the rubber of magnesium oxide and 2-mercapto-4,5-dimethylthiazole.

6. The process which comprises vulcanizing a rubber in the presence of an amount not exceeding 10% by weight based on the rubber of magnesium oxide and an accelerator containing the structure

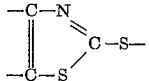

wherein the adjoining carbon atoms do not constitute part of another ring structure.

7. The process which comprises vulcanizing a rubber in the presence of from 0.1% to 3.0% by weight based on the rubber of magnesium oxide and an accelerator containing the structure

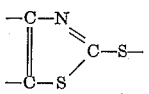

wherein the adjoining carbon atoms do not constitute part of another ring structure.

WARREN E. PHILLIPS.